US008998066B2

(12) United States Patent
Matsunaga (10) Patent No.: US 8,998,066 B2
(45) Date of Patent: Apr. 7, 2015

(54) METHOD FOR HOLDING HIGH SPEED FRICTION SPOT JOINING TOOLS

(71) Applicant: Masahiro Matsunaga, Rolling Hills Estates, CA (US)

(72) Inventor: Masahiro Matsunaga, Rolling Hills Estates, CA (US)

(73) Assignee: Tecnara FSW Company, LLC, Santa Fe Springs, CA (US)

( * ) Notice: Subject to any disclaimer, the term of this patent is extended or adjusted under 35 U.S.C. 154(b) by 0 days.

(21) Appl. No.: 14/061,524

(22) Filed: Oct. 23, 2013

(65) Prior Publication Data

US 2014/0048583 A1    Feb. 20, 2014

Related U.S. Application Data

(62) Division of application No. 13/242,215, filed on Sep. 23, 2011, now abandoned.

(60) Provisional application No. 61/385,884, filed on Sep. 23, 2010.

(51) Int. Cl.
B23K 20/12    (2006.01)

(52) U.S. Cl.
CPC ......... B23K 20/1245 (2013.01); B23K 20/1255 (2013.01); B23K 20/1265 (2013.01)

(58) Field of Classification Search
None
See application file for complete search history.

(56) References Cited

U.S. PATENT DOCUMENTS

| | | | |
|---|---|---|---|
| 5,522,605 A | 6/1996 | Lewis et al. | |
| 6,516,992 B1* | 2/2003 | Colligan | 228/112.1 |
| 7,845,545 B2* | 12/2010 | Packer et al. | 228/112.1 |
| 8,186,567 B2* | 5/2012 | Talwar | 228/175 |
| 2001/0054639 A1 | 12/2001 | Gabzdyl | |
| 2004/0129763 A1* | 7/2004 | Burford et al. | 228/112.1 |
| 2005/0045695 A1* | 3/2005 | Subramanian et al. | 228/112.1 |
| 2006/0081683 A1* | 4/2006 | Packer et al. | 228/112.1 |
| 2006/0175382 A1* | 8/2006 | Packer et al. | 228/112.1 |
| 2007/0102492 A1* | 5/2007 | Nelson et al. | 228/112.1 |
| 2008/0006678 A1* | 1/2008 | Packer et al. | 228/114.5 |
| 2008/0023524 A1* | 1/2008 | Ohashi et al. | 228/2.1 |
| 2009/0001974 A1 | 1/2009 | Sheiretov et al. | |
| 2009/0095795 A1* | 4/2009 | Hunt et al. | 228/112.1 |
| 2009/0120995 A1* | 5/2009 | Hallinan et al. | 228/2.3 |
| 2009/0140027 A1 | 6/2009 | Badarinarayan et al. | |
| 2009/0272788 A1 | 11/2009 | Fukushima et al. | |
| 2009/0294511 A1* | 12/2009 | Fleming et al. | 228/103 |
| 2010/0038405 A1 | 2/2010 | Garner | |
| 2010/0147925 A1* | 6/2010 | Hanlon et al. | 228/112.1 |
| 2010/0200642 A1* | 8/2010 | Burford | 228/112.1 |
| 2010/0219230 A1* | 9/2010 | Packer et al. | 228/112.1 |
| 2010/0279146 A1* | 11/2010 | Rowe et al. | 428/650 |
| 2012/0055977 A1* | 3/2012 | Steel et al. | 228/112.1 |

OTHER PUBLICATIONS

Feng et al., Friction Stir Spor Welding of Advanced High-Strength Steels—A Feasibility Study (2005).*

* cited by examiner

*Primary Examiner* — Kiley Stoner
(74) *Attorney, Agent, or Firm* — Morriss O'Bryant Compagni, PC (57) ABSTRACT

The invention utilizes vibration control, precision manufacturing tolerances for certain components of the system, and techniques for limiting thermal expansion of components, including passive insulation and active cooling techniques, in order to enable high speed tool rotation for Friction Stir Spot Joining of Advanced High Strength Steels.

11 Claims, 8 Drawing Sheets

METHOD FOR HOLDING HIGH SPEED FRICTION SPOT JOINING TOOLS

CROSS REFERENCE TO RELATED APPLICATIONS

This document claims priority to and incorporates by reference all of the subject matter included in the provisional patent application Ser. No. 61/385,884.

BACKGROUND OF THE INVENTION

1. Field of the Invention

This invention relates generally to tools used for friction stir welding (FSW). Specifically, the invention relates to a system for holding a friction stir spot joining tool that is rotated at a high rate of speed.

2. Background of the Problems Being Solved

Friction stir welding is a technology that has been developed for welding metals and metal alloys. The FSW process often involves engaging the material of two adjoining workpieces on either side of a joint by a rotating stir pin. Force is exerted to urge the pin and the workpieces together and frictional heating caused by the interaction between the pin, shoulder and the workpieces results in plasticization of the material on either side of the joint. The pin and shoulder combination or "FSW tip" is traversed along the joint, plasticizing material as it advances, and the plasticized material left in the wake of the advancing FSW tip cools to form a weld. The FSW tip can also be a tool without a pin but only a shoulder for processing of another material through FSP.

Figure 1:
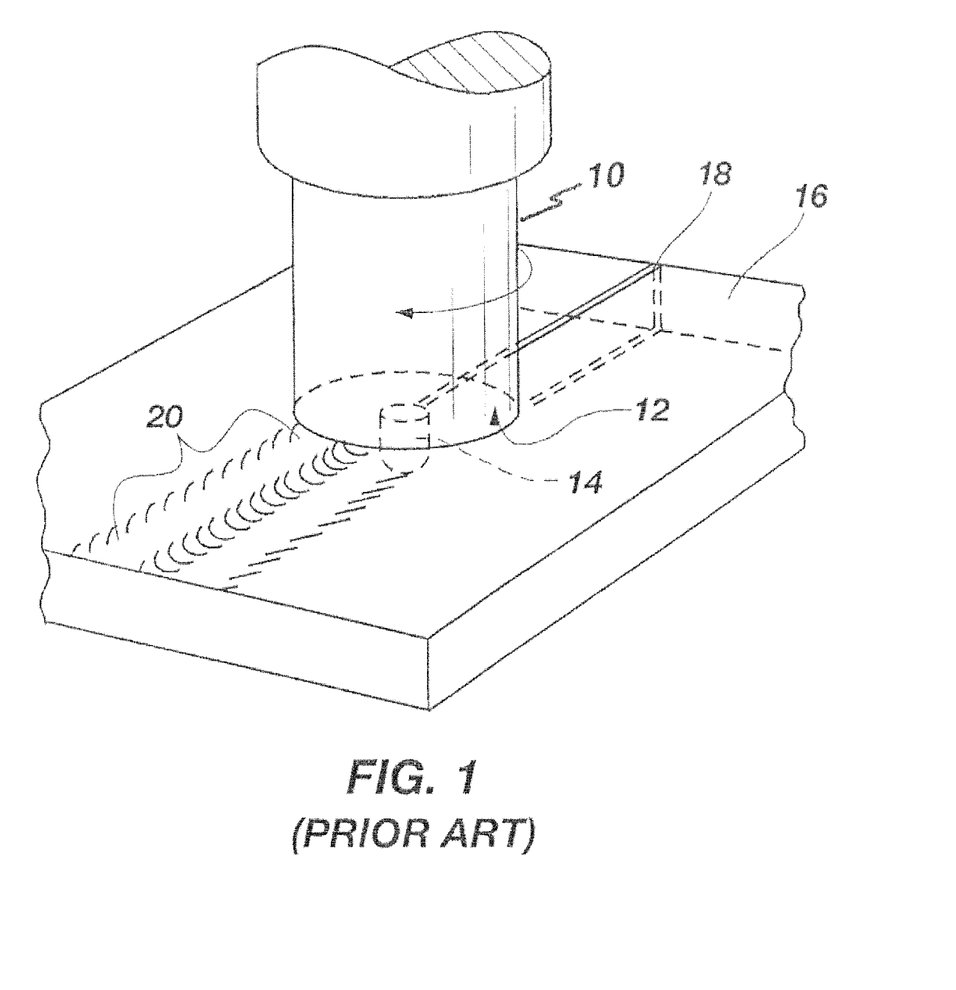
FIG. 1 is a perspective view of a tool as taught in the prior art for friction stir welding.

FIG. 1 is a perspective view of a tool being used for friction stir welding that is characterized by a generally cylindrical tool 10 having a shank 8, a shoulder 12 and a pin 14 extending outward from the shoulder. The pin 14 is rotated against a workpiece 16 until sufficient heat is generated, at which point the pin of the tool is plunged into the plasticized workpiece material. Typically, the pin 14 is plunged into the workpiece 16 until reaching the shoulder 12 which prevents further penetration into the workpiece. The workpiece 16 is often two sheets or plates of material that are butted together at a joint line 18. In this example, the pin 14 is plunged into the workpiece 16 at the joint line 18.

As the tool 10 is rotated, torque is transmitted from the rotating shank 8 to the FSW tip 24. When the tool 10 is being used on a workpiece that is a high melting temperature material such as steel, the FSW tip 24 is in many situations exposed to temperatures in excess of 1000 degrees C. as it is rotated while traversing steel softened by frictional heating.

Referring to FIG. 1, the frictional heat caused by rotational motion of the pin 14 against the workpiece material 16 causes the workpiece material to soften without reaching a melting point. The tool 10 is moved transversely along the joint line 18, thereby creating a weld as the plasticized material flows around the pin 14 from a leading edge to a trailing edge. The result is a solid phase bond 20 at the joint line 18 that may be generally indistinguishable from the workpiece material 16 itself, in contrast to welds using other conventional technologies. It is also possible that the sold phase bond 20 is superior to the original workpiece material 16 because of the mixing that occurs. Furthermore, if the workpiece material is comprised of different materials, the resulting mixed material may also be superior to either of the two original workpiece materials.

It is observed that when the shoulder 12 contacts the surface of the workpieces, its rotation creates additional frictional heat that plasticizes a larger cylindrical column of material around the inserted pin 14. The shoulder 12 provides a forging force that contains the upward metal flow caused by the rotating tool pin 14.

During friction stir welding, the area to be welded and the tool 10 are moved relative to each other such that the tool traverses a desired length of the weld joint. The rotating friction stir welding tool 10 provides a continual hot working action, plasticizing metal within a narrow zone as it moves transversely along the workpiece materials 16, while transporting metal from the leading edge of the pin 14 to its trailing edge. As a weld zone cools, there is typically no solidification as no liquid is created as the tool 10 passes. It is often the case, but not always, that the resulting weld is a defect-free, recrystallized, fine grain microstructure formed in the area of the weld.

Travel speeds are typically 10 to 500 mm/min with rotation rates of 200 to 2000 rpm. Temperatures reached are usually close to, but below, solidus temperatures. Friction stir welding parameters are a function of a material's thermal properties, high temperature flow stress and penetration depth.

Previous patent documents have taught that a tool for friction stir welding of high temperature materials is made of a material or materials that have a higher melting temperature than the material being friction stir welded. In some embodiments, a superabrasive was used in the tool, sometimes as a coating.

Friction Stir Spot Joining

This document pertains more specifically to the problems that are unique to friction stir tools that are being rotated at a high rate of speed compared to other conventional friction stir tools.

Friction Stir Spot Joining (FSSJ) is a solid state joining method typically used to create a lap joint. FSSJ utilizes a rotating tool to plunge into two materials, one material on top of the other, to generate heat and material flow around the tool to allow the two materials to be joined using a diffusion bond. The process steps are to 1) rotate the tool bit, 2) plunge the tool bit through the surface of the top material and into the second material, and 3) retract the tool bit after a period of time.

The FSSJ spot welding process described above has already been implemented in the automotive industry on a production basis on rear doors of a Mazda RX7®. The manufacturer needed to lower the weight of its premier sports car and was able to do so by making many components out of aluminum. FSSJ was the method of choice for joining the aluminum parts together because resistance welding of aluminum is difficult if not impossible to achieve. Other methods that melt the aluminum components to be joined have the same fatal flaw and prevent aluminum from being joined to it to provide any level of joint strength. This is one of the reasons that commercial aircraft are joined together with rivets instead of being fusion welded.

With the high cost of energy it is evident that large corporations using energy intensive manufacturing methods need to implement energy saving plans in order to remain competitive. For example, the automotive industry is facing pressure from the public and new government regulations to improve energy efficiency of all vehicles produced. The most significant economic advantage can be achieved by reducing the weight of vehicles so smaller engines and alternate energy systems to power the vehicles can be employed.

Reducing weight is accomplished through the use of Advanced High Strength Steels (AHSS). For example, by using higher strength steels, thinner steel cross sections can be used to reduce the weight of the car body. The car body or body in white is the heaviest part of the car, except for the engine.

State of the Art

Aluminum parts are no longer a problem to join together since FSSJ has been implemented and is the best joining method choice available. Unfortunately, aluminum is expensive and its use in the automotive sector is limited to expensive cars that make up only a small percentage of total vehicle sales.

AHSS make up the majority of newer materials being implemented in vehicle construction and are made in a range of strengths. The lower the strength, the thicker the cross section must be to carry the load requirements established by the car designer. The higher the strength of the AHSS, cross sections can be thinner to bear the same load requirements. The lower strength AHSS are being joined at this time using resistance spot welding. There continues to be extreme pressure on the automotive industry to further reduce the weight of the vehicle and implement the latest AHSS that have the greatest strength and lowest weight.

Problems with Existing Art

The latest AHSS have been developed and are ready to implement into production. However, there is a serious problem surrounding the ability to join these steels. These steels have been strengthened by using special chemistries to maximize the strength in combination with "working" or mechanically strengthening the steel. An example of the result of using this work-hardened material is seen when bending a coat hanger to a ninety degree angle. It is extremely difficult to bend the hangar back to a straight position because the location of the bend has been mechanically strengthened and can no longer return to its original position.

This work-hardening method is used with the AHSS to elevate the strength of the material. Unfortunately, when the steel is melted during the conventional resistance spot welding process, all of the benefits of the work-hardening process are lost since the material at the spot joint has been melted and re-solidified. In addition, as the spot joint solidifies, it has a lower strength at the solidification point, while the surrounding material is the higher strength work-hardened material. This results in cracking and joint failure at the spot joint. Several attempts have been made on the higher strength AHSS to reduce or eliminate this problem. However, the root cause of failure cannot be eliminated since the resistance spot joint creates a melted and re-solidified joint.

The advantages of using FSSJ of steels using a Polycrystalline Cubic Boron Nitride (PCBN) tool materials and tip geometries are well known in the industry. Furthermore, FSSJ becomes more feasible by increasing the rotational speed of the tool tip by increasing heat input and reducing axial load requirements of the tip that engages with the materials to be joined together.

However, there are many practical problems associated with implementing high rotational spindle speed tools into an FSSJ manufacturing operation. Premature PCBN tool failure, spindle bearing failure, and safety issues are problems associated with using high rotational speed bits for FSSJ of AHSS. These problems are due to the vibration that occurs if a high rotational speed component is not properly configured and balanced and held in place. In addition, in many cases the rotating tool tip must be extended far away from the spindle bearings making it even more difficult to properly hold and operate the tip. The cutting tool industry has dealt with the vibration issues. However, the resulting high temperatures, thermal expansion of components and high rotation speeds make it extremely difficult for a practical FSSJ application in any industry to succeed.

It would be an advantage over the prior art to provide a system for performing FSSJ of AHSS while overcoming the problems of vibration and thermal expansion of components.

BRIEF SUMMARY OF THE INVENTION

In one embodiment of the present invention, a system and method is taught that enables high rotational speeds to be applied from the tool holding machine to the FSSJ tip. The invention utilizes vibration control, precision manufacturing tolerances for components of the system, and techniques for limiting thermal expansion of components, including passive insulation and active cooling techniques, in order to enable high speed tool rotation for Friction Stir Spot Joining of Advanced High Strength Steels.

These and other aspects, features, advantages of the present invention will become apparent to those skilled in the art from a consideration of the following detailed description taken in combination with the accompanying drawings.

DETAILED DESCRIPTION OF THE INVENTION

Reference will now be made to the drawings in which the various elements of embodiments of the present invention will be given numerical designations and in which the invention will be discussed so as to enable one skilled in the art to make and use the embodiments. It is to be understood that the following description is only exemplary of the principles of the present invention, and should not be viewed as narrowing the claims which follow.

Figure 2:
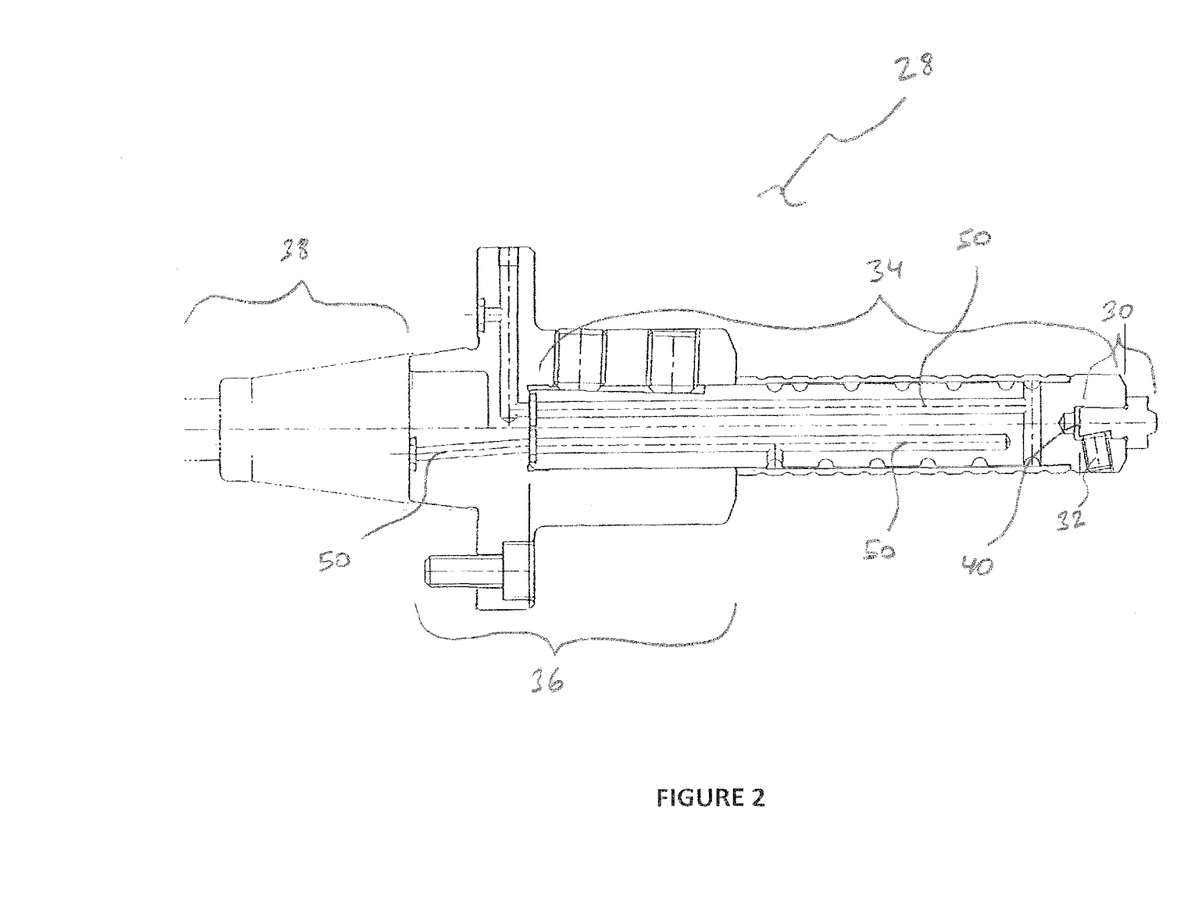
FIG. 2 is a cross-sectional profile view of the components of a high speed friction stir spot joining machine and a FSSJ tip being held in the machine.

FIG. 2 shows the elements of a first embodiment of the present invention. It should be understood that following figures show a single implementation of the principles of the present invention, and thus the invention should not be considered to be limited to the specific embodiment being shown. This embodiment is for illustration purposes only and can be modified and still be considered to be within the scope of the present invention.

The components of the present invention are shown in FIG. 2 and include a FSSJ tip or tool 30, a set screw 32, an extended shank 34, a shank holder 36 and a spindle 38. Each of these components will now be described in more detail in order to understand the modifications that have been made thereto.

Between the FSSJ tip 30 and the extended shank 34 is a FSSJ tip cavity 40 (cavity 40 hereinafter) in a working end of the extended shaft. The FSSJ tip cavity 40 surrounding the FSSJ tip 30 is precisely and accurately made as either a cylindrical or a multifaceted configuration. What is important is that the FSSJ tip 30 is unable to move within the cavity 40.

The set screw 32 is disposed at an angle through the extended shank 34 and is used to retain the FSSJ tip 30. The concentricity and accuracy of the FSSJ tip 30 and cavity 40 are critical for preventing vibration and maintaining smooth performance of the FSSJ system 28.

Not shown in FIG. 2 but what should be considered another element of the present invention is a thermal insulating material that can be applied to the inside surface of the cavity 40 either by coating the cavity or through the use of a sleeve between the FSSJ tip 30 and the cavity in order to maintain steady state thermal conditions of the FSSJ tip 30.

A significant difference in the first embodiment as compared to the prior art is that the extended shank 34 has a greater length when compared to typical rotating tools used for machining and as such must have extreme accuracy. The extended shank 34 includes at least one internal cooling channel 50 which is completely enclosed within the body of the extended shank to form a closed loop cooling system. The internal cooling channel 50 is necessary to prevent thermal expansion along the axis of the extended shank 34 which would change the length of the FSSJ system 28. If thermal expansion were not addressed, a repeatable position of the FSSJ tip 30 relative to the work piece could not be established. The cooling channel 50 can be created by making the extended shaft 34 in two parts that are joined together.

Figure 3:
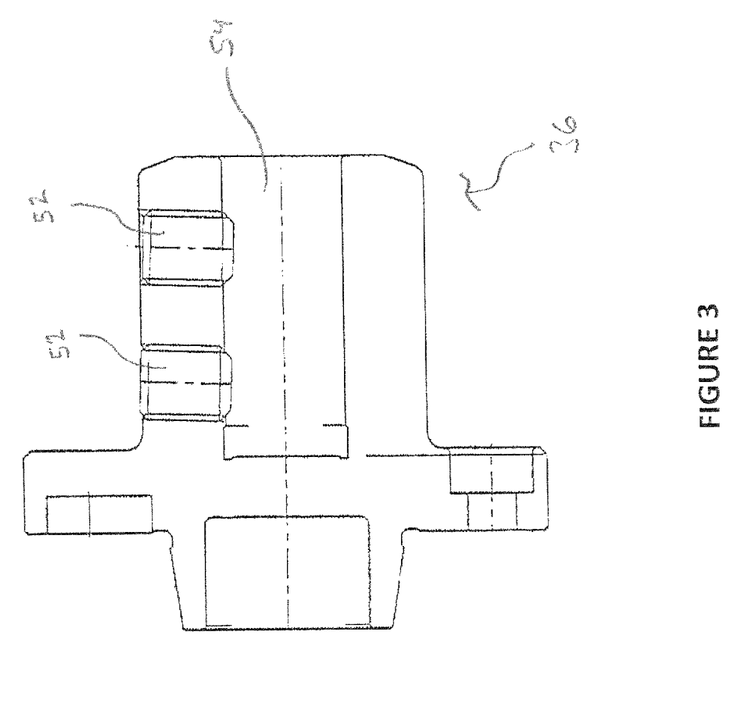
FIG. 3 is a close-up view of the shank holder of the present invention.

The final component of the FSSJ system 28 shown in FIG. 2 is the shank holder 36 that attaches to the machine spindle 38. FIG. 3 shows a typical standard 30 taper that allows attachment of this shank holder 36 to a standard spindle nose configuration of the machine spindle 38. Shank holder 36 includes a shank holder cavity 54 (cavity 54 hereinafter) for the extended shank 34. Also not shown is an adjustment stop located within the shank holder 36 for making adjustments to the position of the extended shank 34.

Set screws 52 are shown in the wall of the shank holder 36 to prevent rotation of the extended shank 34 during FSSJ. However other means for preventing rotation of the extended shank 34 can be used such as collets, taper locking mechanisms, etc. without departing from the scope of the present invention.

Another feature of the FSSJ system is the inclusion of an accelerometer or other vibration measurement device that is coupled to the shank holder 36 or to the extended shank 34 to enable vibration measurements. Vibration measurements enable the user or the FSSJ system to stop the FSSJ tip rotation if an unsafe or ill advised vibration mode is detected during the FSSJ process.

As shown in FIG. 2, coolant is ported through channel 50 through the shank holder 36 from the machine spindle 38 in order to have closed loop coolant flow that returns coolant back through the FSSJ system 28. It is important to note that the coolant can be either a liquid or a gas and that it can be ported from the spindle as shown or from another location such as the outside diameter of the tool holding system.

Figure 4:
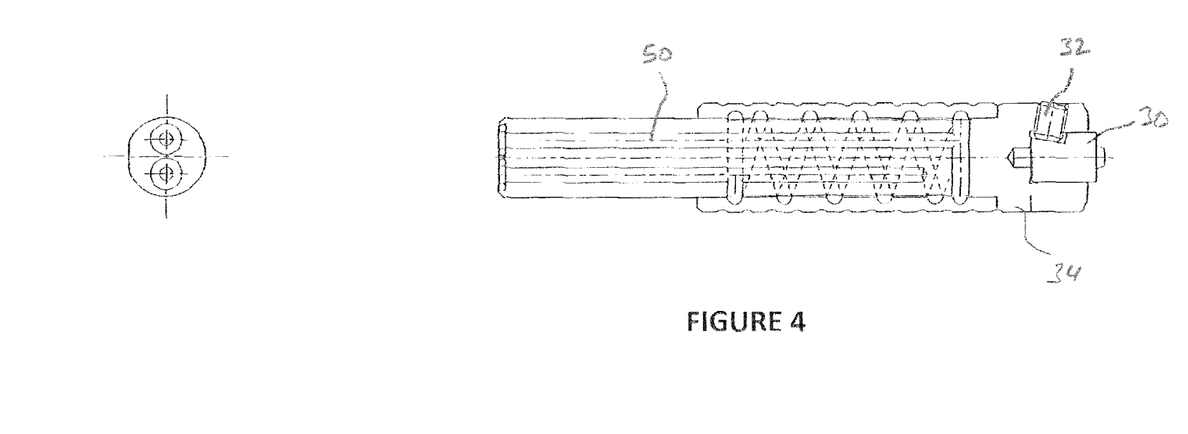
FIG. 4 is a first cooling configuration in the extended shank with a first FSSJ tip configuration and an end view showing in and out coolant ports.
Figure 5:
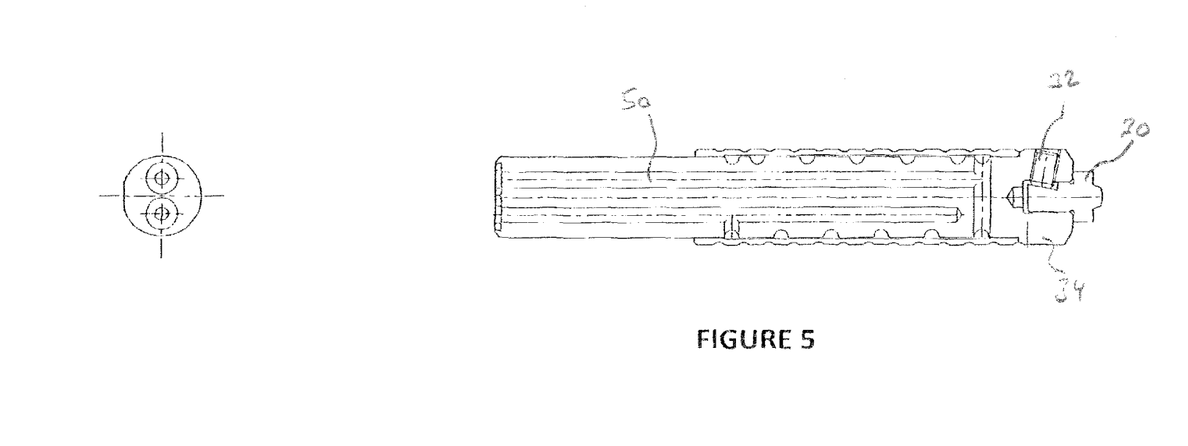
FIG. 5 is a second cooling configuration in the extended shank with a second FSSJ tip configuration and an end view showing in and out coolant ports.

FIGS. 4 and 5 are provided as cross-sectional views of the extended shank 34. These figures show two different cooling configurations in the extended shank 34 as well as two different FSSJ tip configurations. What is important to show is that more cooling channels 50 may be required for some applications than others, and the addition of and the path of the cooling channels is not a limitation of the present invention.

Figure 6:
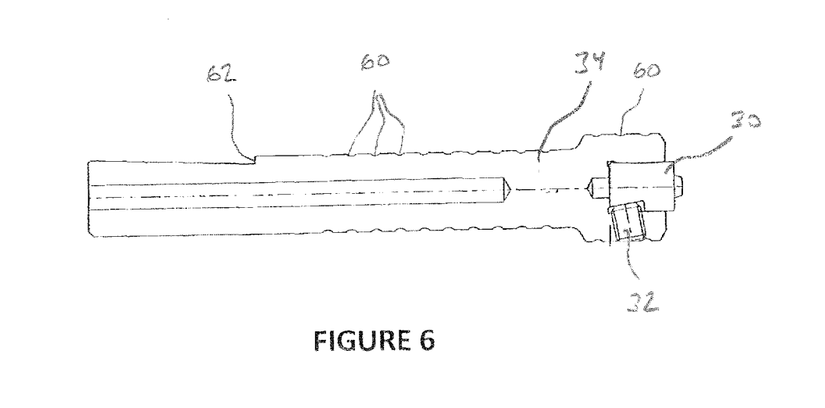
FIG. 6 shows a first extended shank configuration that has external cooling grooves and/or fins for air cooling. Also shown is a locking flat on the extended shank to prevent extended shank rotation in the shank holder.
Figure 7:
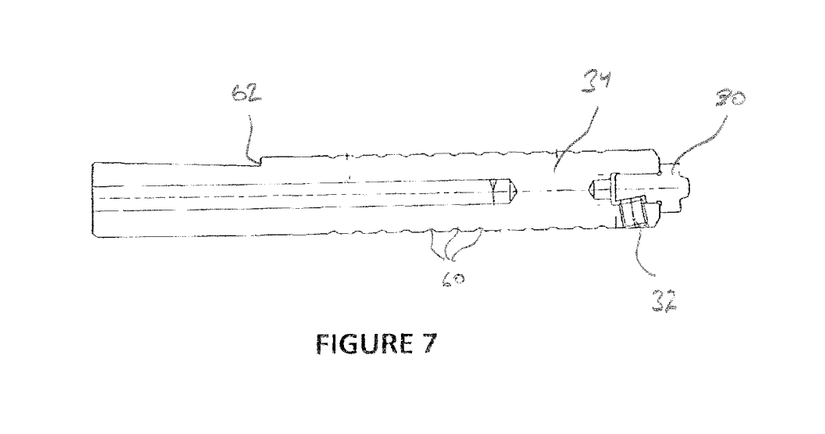
FIG. 7 shows a second extended shank configuration that has external cooling grooves and/or fins for air cooling. Also shown is a locking flat on the shank to prevent extended shank rotation in the shank holder.

FIGS. 6 and 7 show two different cross-sectional views of extended shank 34 configurations that have external cooling grooves 60 and/or fins instead of the internal liquid or gas cooling. Also shown is a locking flat 62 on the extended shank 34 to prevent extended shank rotation in the shank holder 36.

Figure 8:
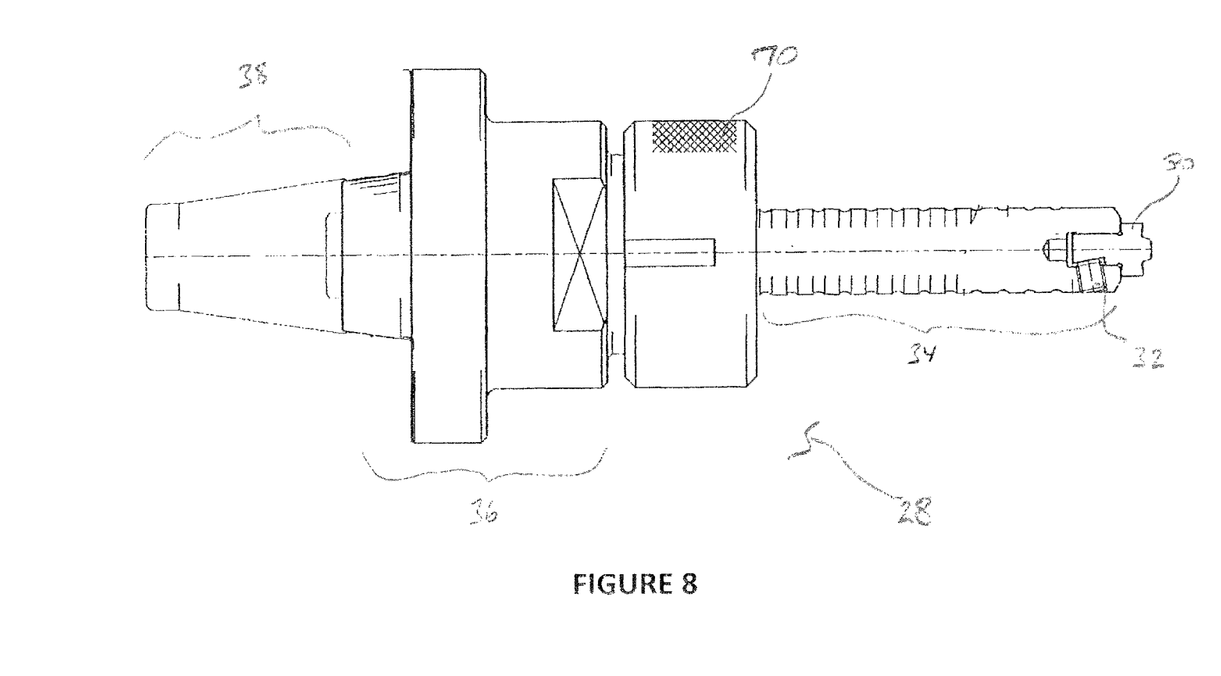
FIG. 8 shows a collet holding system with a collet disposed around the extended shank to prevent extended shank rotation in the holding shank.

FIG. 8 is a profile and partial cross-sectional view of an alternative embodiment of the FSSJ system 28 which shows a collet holding system having a collet 70 being used for holding the extended shank 34 to prevent extended shank rotation in the shank holder 36.

Figure 9:
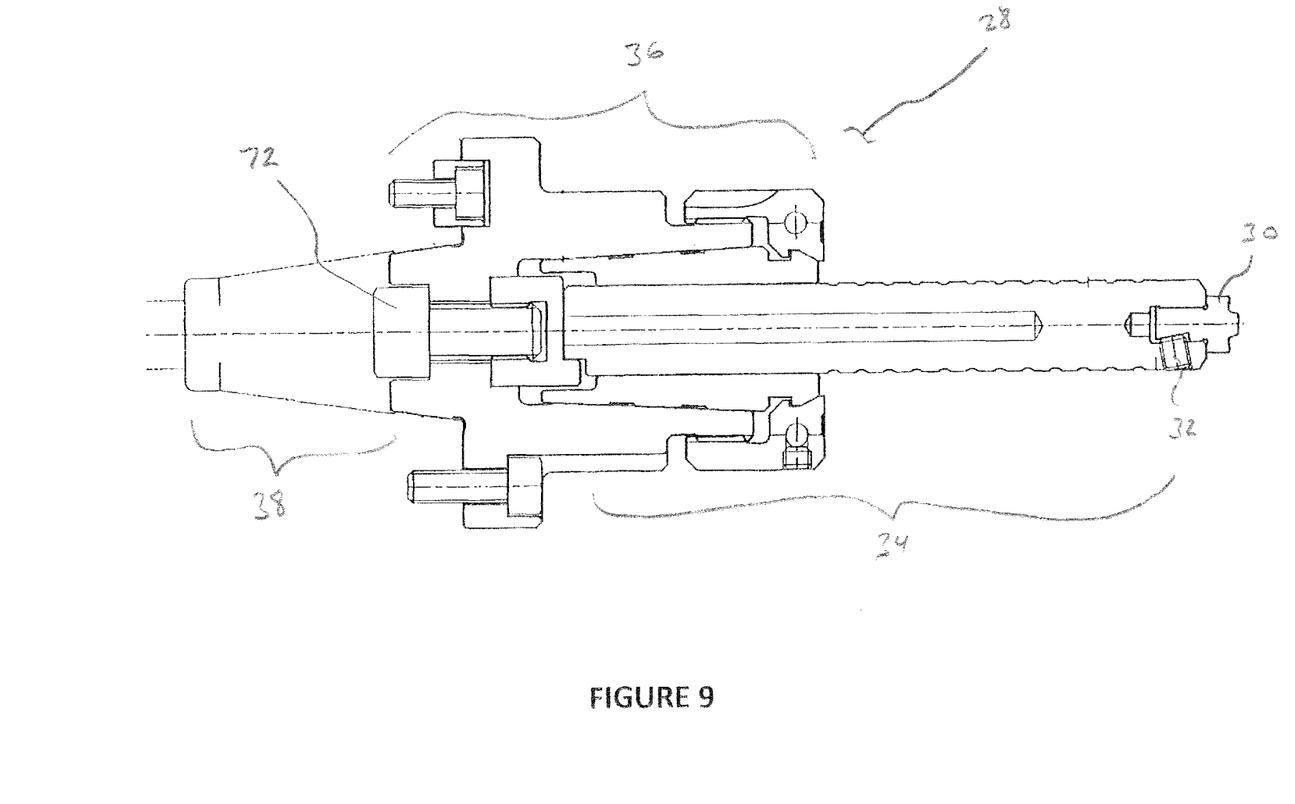
FIG. 9 shows a cross section of the collet holding system of FIG. 8.

FIG. 9 is a cross-sectional vies of the FSSJ system 28 that shows the collet 70 shown in FIG. 8. This figure shows an example of an M10 bolt 72 that retracts the collet 70 to thereby apply holding pressure on the extended shank 34. Using a clockwise motion on the M10 bolt 72 adjusts the extended shank 34 to a stop position while tightening the collet 70. Likewise, counterclockwise loosening of the M10 bolt 72 expels the extended shank 34.

Figure 10:
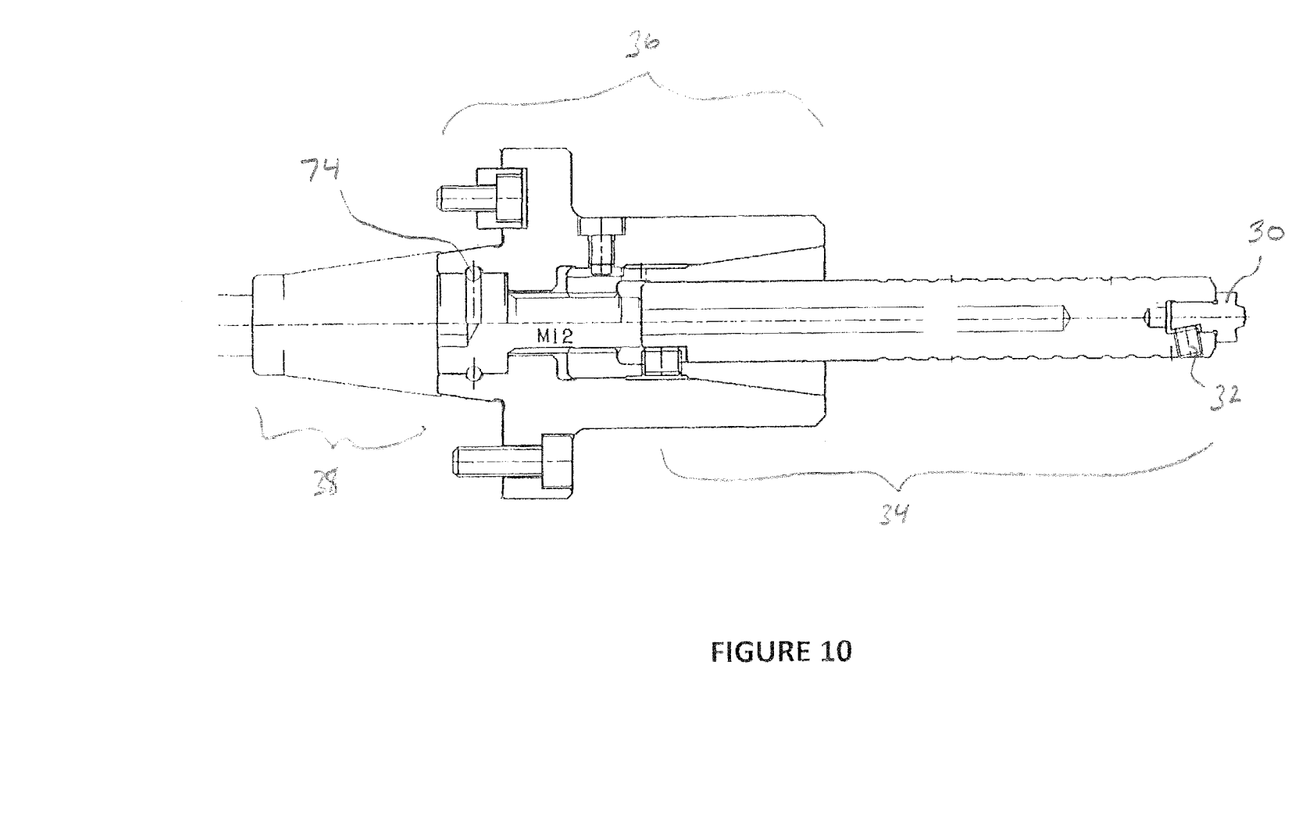
FIG. 10 shows another embodiment where ball bearings are used in combination with the collet holding system such that accuracy of extended shank position is maintained during tightening.

FIG. 10 is a cross sectional view of another embodiment of the present invention, which shows where ball bearings 74 are used in combination with the collet 70 such that accuracy of extended shank 34 position is maintained during tightening. Ball bearing support of the tightening mechanism is used to maintain extended shank 34 concentricity during tightening.

These illustrations are only a few configurations possible within the scope of this invention. It is important to note that the FSSJ tip holding, extended shank design and construction and shank holder that mounts to a machine spindle, are designed and made as a unit to manage load, vibration, and thermal cycles experienced during FSSJ.

In another aspect of the present invention, it is noted that by following the principles of design and operation, common computer numerical control (CNC) machining centers can be converted into precision FSSJ machines, thus enabling the machine to provide dual capability.

It should be understood that this also implies that the features of an automatic tool changer would be implemented into the design of the FSSJ system being employed.

An important aspect of the invention is the application of this FSSJ process in situations where the work pieces to be joined cannot be brought immediately adjacent to the FSSJ tip. In other words, when manufacturing certain items, such as vehicles, the components of a vehicle have to remain on an assembly line. Therefore the FSSJ machine must be manufactured such that it can reach the objects to be joined.

In this example, robots are often used in vehicle construction. Robots have failed to perform adequate FSSJ because of the reasons cited in the prior art. However, the present invention enables a robot to extend the FSSJ tip a substantially greater distance from the spindle that is causing the rotation of the FSSJ tip. Using the present invention, an FSSJ tip can now be extended further from an FSSJ machine and perform FSSJ of the components of an automobile that are manufactured using AHSS.

Operation of the FSSJ system 28 includes understanding the typical operating parameters. For example, the design of the FSSJ system 28 is particularly robust in order to support rotation of the FSSJ tip 30 at greater than 4000 RPM. The outside diameter of the FSSJ tip 30 is configured as a cylinder, a cylinder with a flat, or a series of flats that form a square, hexagon, octagon or other deviation from a cylindrical shape. The FSSJ tip 30 configuration may also be tapered from end to end with these same geometric configurations. However, it is preferable that at least one flat on the diameter or outer portion of the FSSJ tip 30 forms a drive flat. At least a portion of the side opposite the FSSJ tip 30 side engaged with the work piece contacts the extended shank 34. A heat shrink configuration can be used between the extended shank 34 and the FSSJ tip 30.

As explained previously, there exists an insulation or thermal barrier between the FSSJ tip 30 and the extended shank 34. The insulation preferably has but is not limited to a thermal conductivity of greater than 0.000018 W/mK. The clearance gap between the FSSJ tip 30 and the cavity 40 of the extended shank 34 is preferably no greater than 0.001" (0.025 mm). The run-out or out-of-concentricity is preferably no greater than 0.005" (0.127 mm).

For high speed operation of the present invention, is it preferred but not required that the concentricity of the FSSJ tip be within 0.0004" T.I.R., that the tip diameter be within +/−0.00008", that the extended shank length stay within 150-160 mm, and that cooling be performed because not only is cooling vital for keeping the extended shank axis length stable, but it also prevents spindle heat coming from the spotting operation.

In another aspect of the invention, the extended shank 34 has internal cooling channels 58 that are closed to the outside environment. The cooling may be a liquid or gas. Features such as fins or grooves 60 or any other non-smooth surface utilize air for cooling. The extended shank 34 is made with a two piece construction to allow for cooling channel 50 construction. The extended shank is preferably made from any metallic or ceramic material as is known to those skilled in the art of high FSW.

In another aspect of the invention, the extended shank 34 end opposite the FSSJ holding tip end mechanically attaches to a shank holder 36. The shank holder 36 attaches to a machine spindle 38 having a standard industry taper (30, 35, 40, 45, 50 NMTB or ISO). Liquid or gas cooling is ported through the shank holder 36 in any longitudinal or transverse attachment of flow pattern. The shank holder 36 has at least one set screw 52 to prevent rotation of the extended shank 34. The extended shank 34 has at least one flat for set screw engagement. A collet 70 holding method is employed in the shank holder 36 to hold the extended shank 34. Ball bearings 74 may be used in the shank holder 36 around the tightening mechanism to maintain accuracy. An adjustment stop is located in the shank holder 36 to adjust extended shank 34 position in the shank holder. An accelerometer or other vibration measurement device is coupled with the shank holder 36 or extended shank 34 to measure vibration and stop the FSSJ tip 30 rotation if an unsafe or ill advised vibration mode is created during the FSSJ process.

In another aspect of the invention, the principles of the FSSJ system described above are applied to and used to modify an existing machining center to convert it to a precision FSSJ machine.

In another aspect of the invention, a FSSJ system provides any component of the FSSJ system described above as a tool and has features necessary to be used in an automatic tool changing system. Finally, a FSSJ system is a purpose-built machine for FSSJ with an automatic tool changer.

In a final aspect of the present invention, it is known in the industry that a robot that is performing spot welding cannot apply sufficient Z force to compress two materials for better bonding. Thus, another aspect of the invention is that the same robots can continue to be used with the present invention. This is possible because a FSSJ tool that is rotating at higher speeds than state of the art FSSJ machines requires a lower Z force to obtain proper bonding.

It is to be understood that the above-described arrangements and embodiments are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for performing high speed friction stir spot joining (FSSJ) of metal work pieces using an FSSJ system, said method comprising:
   1) providing an FSSJ system including an FSSJ tip comprised of a shank, a shoulder and a pin, providing an extended shank that rotates the FSSJ tip and which holds the FSSJ tip against work pieces at a distance, providing a shank holder which holds and rotates the extended shank, and coupling a spindle to the shank holder and thereby making the shank holder and the extended shank an extension of the rotating tool, wherein the extended shank includes a plurality of channels for a cooling fluid, the plurality of channels extending through the extended shank from a distal end held by the shank holder and ending in proximity but short of reaching the shank of the FSSJ tip;
   2) rotating the FSSJ tip by rotating a spindle that is coupled to the shank holder and by rotating a spindle motor that rotates the spindle at a rate of speed that is greater than 4000 revolutions per minute (RPM) to thereby preserve the benefits of using Advanced High Strength Steels (AHSS) that have been hardened as the work pieces; and
   3) plunging the FSSJ tip into and then removing the FSSJ tip from at least two metal workpieces to thereby perform high speed FSSJ of the at least two metal work pieces in a FSSJ process.

2. The method as defined in claim 1 wherein the method further comprises reducing the weight of vehicles by using AHSS in their construction and joining the AHSS members by using FSSJ.

3. The method as defined in claim 1 wherein the method further comprises increasing heat input to the FSSJ process by providing a thermal insulating material to increase the temperature of the FSSJ tip.

4. The method as defined in claim 1 wherein the method further comprises cooling the extended shaft by causing the cooling fluid to flow through the cooling channels to thereby regulate temperature and prevent axial expansion of the extended shank and to thereby increase accuracy of the FSSJ system.

5. The method as defined in claim 1 wherein the step of cooling the extended shaft further comprises disposing a plurality of grooves or fins on the external surface of the extended shaft.

6. The method as defined in claim 1 wherein the method further comprises providing the extended shaft in order to increase a reach of the FSSJ tip so that the FSSJ process can reach objects that cannot be brought immediately adjacent to the FSSJ tip.

7. The method as defined in claim 1 wherein the method further comprises providing a collet holding system disposed around a portion of the extended shank and coupled to the shank holder to thereby prevent rotation of the extended shank relative to the shank holder.

8. The method as defined in claim 7 wherein the method further comprises providing ball bearings in the shank holder to thereby enable improved accuracy of extended shank positioning when the extended shank is coupled to the shank holder.

9. The method as defined in claim 1 wherein the method further comprises providing a vibration measurement device that can determine when an undesirable vibration is being generated on the FSSJ tip so that rotation of the FSSJ tip can be stopped.

10. The method as defined in claim 1 wherein the method further comprises providing an automatic tool changing system to thereby enable the FSSJ system to be used in machining applications other than spot joining.

11. The method as defined in claim 1 wherein the method further comprises modifying a CNC machining center to perform the FSSJ process such that the machine is capable of performing both CNC and FSSJ functions.

* * * * *